(12) United States Patent
King (10) Patent No.: US 11,067,295 B2
(45) Date of Patent: Jul. 20, 2021

(54) HEAT EMITTING RADIATOR

(71) Applicant: Ray King, Pickering (CA)

(72) Inventor: Ray King, Pickering (CA)

( * ) Notice: Subject to any disclaimer, the term of this patent is extended or adjusted under 35 U.S.C. 154(b) by 499 days.

(21) Appl. No.: 15/867,544

(22) Filed: Jan. 10, 2018

(65) Prior Publication Data

US 2018/0347832 A1    Dec. 6, 2018

(30) Foreign Application Priority Data

Jan. 10, 2017    (CA) .............................. CA 2954184

(51) Int. Cl.

| | |
|---|---|
| *F24D 19/10* | (2006.01) |
| *F28D 20/00* | (2006.01) |
| *F28D 1/02* | (2006.01) |
| *F28F 27/00* | (2006.01) |
| *F28D 1/053* | (2006.01) |
| *F24H 7/02* | (2006.01) |
| *F24H 7/04* | (2006.01) |
| *H05B 3/78* | (2006.01) |
| *H05B 3/42* | (2006.01) |
| *F24D 11/00* | (2006.01) |
| *F24D 19/00* | (2006.01) |
| *F28D 21/00* | (2006.01) |

(52) U.S. Cl.
CPC ........ *F24D 19/1084* (2013.01); *F24D 11/006* (2013.01); *F24D 19/008* (2013.01); *F24H 7/0233* (2013.01); *F24H 7/0241* (2013.01); *F24H 7/0433* (2013.01); *F28D 1/0226* (2013.01); *F28D 1/05358* (2013.01); *F28D 20/0056* (2013.01); *F28F 27/00* (2013.01); *H05B 3/42* (2013.01); *H05B 3/78* (2013.01); *F24D 2200/02* (2013.01); *F24D 2200/15* (2013.01); *F24D 2220/0207* (2013.01); *F24D 2220/042* (2013.01); *F24D 2220/2027* (2013.01); *F24D 2220/2045* (2013.01); *F24D 2220/2054* (2013.01); *F24D 2220/2063* (2013.01); *F28D 2020/0013* (2013.01); *F28D 2021/0035* (2013.01); *Y02E 60/14* (2013.01)

(58) Field of Classification Search
CPC ................................................ F24D 19/1084
USPC ....................................................... 219/494
See application file for complete search history.

(56) References Cited

U.S. PATENT DOCUMENTS 6,692,518 B2 *    2/2004   Carson ................. A61F 7/0085
                                                                  219/428

* cited by examiner

*Primary Examiner* — Lauren A Crane
(74) *Attorney, Agent, or Firm* — Shawn Gordon, Esq.; Dunkiel Saunders Elliott; Raubvogel & Hand, PLLC (57) ABSTRACT

A heat emitting radiator for use in a fluid circuit containing coolant therein, and which can generate substantial amounts of heat to heat larger spaces, such as in a home or business, while utilizing minimal power to run, and which can be utilized in various implementations and configurations. The radiator can be selectively activated or de-activated by, for example, a cell phone or the like whereby the fluid circuit in the radiator can be monitored for time of use, temperature and cost of use.

9 Claims, 7 Drawing Sheets

HEAT EMITTING RADIATOR

This invention relates generally to a heat emitting radiator, and more particularly to an improved heat emitting radiator for use in a circuit having fluid therein, which can be selectively activated or de-activated by, for example, a cell phone or the like whereby the circuit can be monitored for time of use, temperature and cost of use.

DESCRIPTION OF THE PRIOR ART

It is well known that radiators are used to transfer thermal energy from one medium to another for the purpose of cooling and heating. Typically, the majority of radiators are constructed to function in automobiles, buildings, and electronics. The radiator is usually a source of heat to its environment, although this may be for either the purpose of heating this environment, or for cooling the fluid or coolant supplied to it, as for engine cooling. It is also known that radiators are commonly used to heat homes and buildings. In a central heating system using radiators, hot water or sometimes steam is generated in a central boiler, and circulated by pumps through radiators within the home or building, where this heat is then transferred to the surroundings. However, such systems usually continually draw power and energy for their use, especially in winter, and therefore incur higher heating costs. Furthermore, such systems can have larger footprints overall, making them cumbersome to use in smaller spaces. Moreover, radiators can produce very high temperatures at local areas of a room, particularly adjacent the radiator.

What is required is an improved heat emitting radiator which has a generally uncomplicated and simple design, which has a minimal footprint, and which can generate substantial amounts of heat to heat larger spaces, such as in a home or business, without $CO_2$ or other emissions, while utilizing minimal power to run, and which can be utilized in various implementations and configurations. Thus, there is a need for an improved environmentally friendly heat emitting radiator for heating a space which may be installed easily, and is durable and reliable, which can be selectively activated or de-activated by, for example, a cell phone or the like whereby the circuit can be monitored for time of use, temperature and cost of use.

Furthermore, there is also a need for a heat emitting radiator which possesses easily removable or replaceable heating elements within the radiator, and which can operate with having a conventional fluid circuit having coolant therein to be heated. In this regard, the present invention substantially fulfills this need.

SUMMARY OF THE INVENTION

It is an object and advantage of the present invention to provide an improved heat emitting radiator which has a generally uncomplicated and simple design, and which has a minimal footprint.

It is another object and advantage of the present invention to provide an improved heat emitting radiator which can generate substantial amounts of heat to heat larger spaces, such as in a home or business, while utilizing minimal power to run, and which can be utilized in various implementations and configurations.

It is yet another object and advantage of the present invention to provide an improved heat emitting radiator for use in a circuit having fluid therein, which can be selectively activated or de-activated by, for example, a cell phone or the like and whereby the circuit can be monitored for time of use, temperature and cost of use.

According to one aspect of the present invention, there is provided a heat emitting radiator for heating a space, comprising a fluid circuit within the radiator for retaining coolant therein, the fluid circuit further comprising at least one opening defined therein in communication with the fluid circuit; at least one heating element constructed and arranged for insertion into the at least one opening and projecting into the fluid circuit, the at least one heating element being removable without disassembly of the fluid circuit, whereby the at least one heating element is in direct contact with the coolant to heat the coolant; and monitoring means for selectively activating or de-activating the radiator through a remote device, and monitoring parameters of the radiator.

According to another aspect of the present invention, there is provided a heat emitting radiator for heating a space, comprising a fluid circuit within the radiator for retaining coolant therein, the fluid circuit further comprising at least one opening defined therein in communication with the fluid circuit; at least one heating element constructed and arranged for insertion into the at least one opening and projecting into the fluid circuit, the at least one heating element being removable without disassembly of the fluid circuit, whereby the at least one heating element is in direct contact with the coolant to heat the coolant; at least one radiator panel for securing therein the fluid circuit; a thermostatic control adapted to selectively turn off the radiator when a selected determined shut off temperature within the fluid circuit has been achieved, and then activate the heat emitting radiator to an active position when a selected turn on temperature within the fluid circuit has been achieved; and a sensor for monitoring parameters of the radiator through a remote device.

According to another aspect of the present invention, there is provided a method of manufacturing a heat emitting radiator comprising the steps of providing a fluid circuit within the radiator for retaining coolant therein, providing the fluid circuit with at least one opening defined therein for being in communication with the fluid circuit; providing at least one heating element constructed and arranged for insertion into the at least one opening to project into the fluid circuit; enabling the at least one heating element to be removable without disassembly of the fluid circuit, whereby the at least one heating element is in direct contact with the coolant to heat the coolant; and providing monitoring components for selectively activating or de-activating the radiator through a remote device, and monitoring parameters of the radiator.

BRIEF DESCRIPTION OF THE DRAWINGS

A preferred embodiment of the present invention is described below with reference to the accompanying drawings, in which.

DESCRIPTION OF THE PREFERRED EMBODIMENT

In the preferred embodiment, and with reference to FIGS. 1 and 2, the heat emitting radiator 1 of the present invention comprises various components, as hereinafter described. This heat emitting radiator, in an exemplary embodiment, has therein monitoring components for selectively activating or de-activating the radiator through a remote device, and monitoring parameters of the radiator. In an exemplary embodiment, the radiator possesses an internal fluid circuit (or, alternatively, could also utilize a closed loop fluid flow circuit). The present invention has a generally uncomplicated and simple design, has a minimal footprint, and can generate substantial amounts of heat to heat spaces, such as in a home, business or otherwise, while utilizing minimal power to run, and can be utilized in various implementations and configurations.

Figure 1:
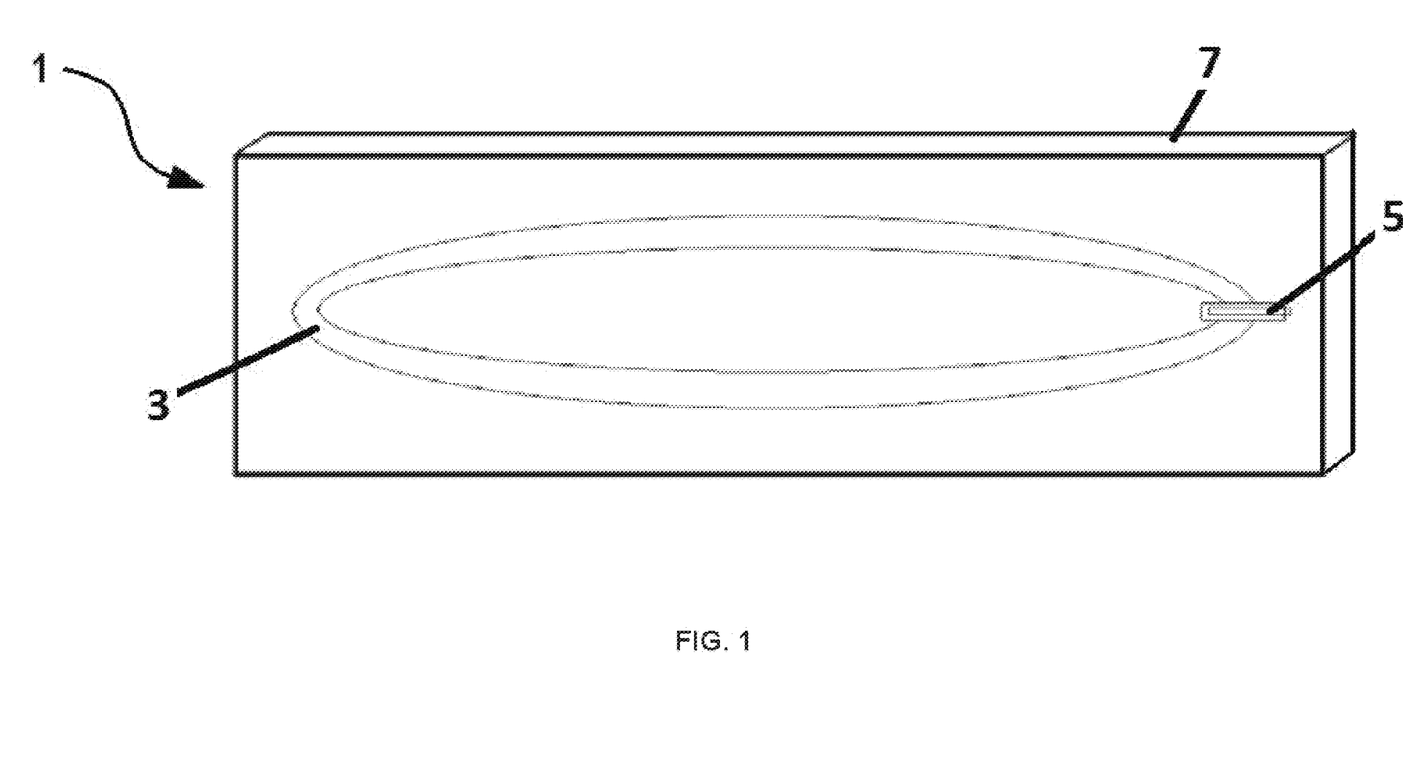
FIG. 1 is a side view of one embodiment of the heat emitting radiator of the present invention, illustrating a heating element projecting into the fluid circuit on the rise side thereof.
Figure 2:
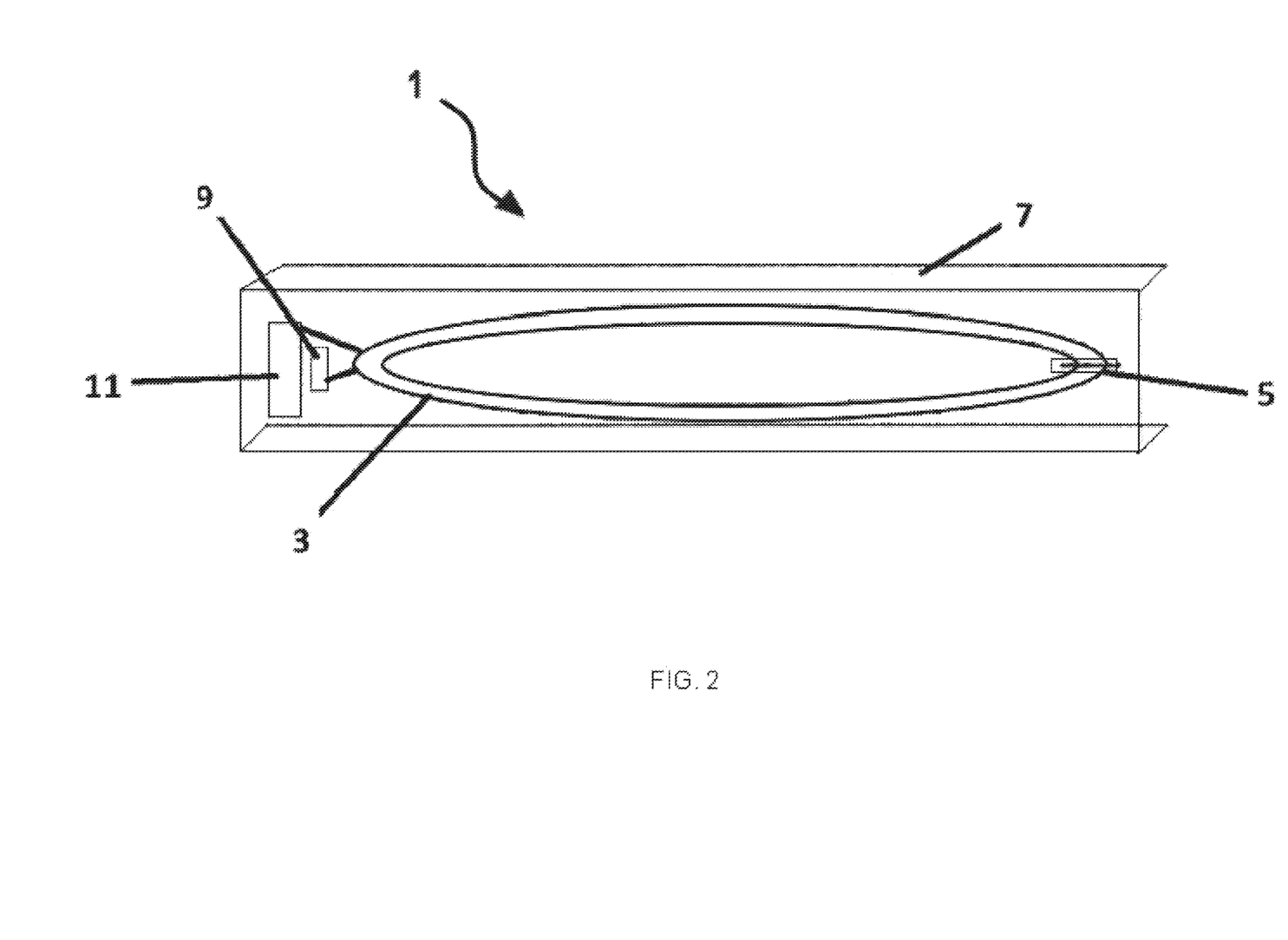
FIG. 2 is a side view of the embodiment of the heat emitting radiator of the present invention shown in FIG. 1, illustrating the thermostatic control and the sensor in communication with the flow circuit.

With reference to FIGS. 1 and 2, the heat emitting radiator 1 of the present invention comprises a fluid circuit 3 positioned within a base panel 7, the fluid circuit 3 being a closed hollow tube integrated therewith (and having coolant therein), though it will be understood that one or more such interconnected flow tubes comprising the fluid circuit could be utilized, as would be apparent to one skilled in the art. Of course, the fluid circuit will contain coolant therein which, in an exemplary embodiment, is water.

As can also be readily seen in FIGS. 1 and 2, a heating element 5 is inserted to project into the fluid circuit 3, it being understood, of course, that such positioning of the heating element 5 can occur anywhere along a length of the fluid circuit 3, to be in direct contact with the coolant within the fluid circuit 3 and heat it. Of course, it will be readily understood that a plurality of such heating elements could also be used, as would be apparent to one skilled in the art.

In an alternative embodiment, the radiator 1 can be a closed loop fluid flow circuit for permitting a flow of the coolant therethrough, wherein a pump (not shown) would be utilized in the system to continuously circulate the coolant throughout the closed loop fluid flow circuit to be heated by the heating element 5 or heating elements. In an exemplary embodiment, such a closed loop fluid flow circuit will preferably be in a vacuum environment.

Preferably, the heating element 5 is a DC electrical heating element, though it is conceivable that other types of heating elements could be utilized, such as AC heating elements or the like, as would be apparent to one skilled in the art. These can be easily removable and replaceable if required, without disassembly of any other components of the fluid circuit 3. In an exemplary embodiment, the heating elements are made of stainless steel-316, and nickel, though of course it will be understood that variations to this are possible.

The heating element 5 or heating elements are supplied with power from a power source (not shown) for enabling the heating element 5 to heat the coolant within the fluid circuit. In one embodiment, the power source is an electrical type power source, or a power pack, though it is conceivable that, alternatively, other types of power sources could be utilized, such as solar power cells, turbine power, A/C power, DC power, battery power, wind generated power or the like, as would be apparent to one skilled in the art. Of course, it would be readily apparent that a power cell could also be re-energized or re-charged, as is also known in the art. The present invention can be run on from between 50 to 300 watts of power, though it will be understood that variations to this are possible. In an exemplary embodiment, the system can run on only 100 watts of power.

In a further embodiment, and with reference to FIG. 2, the radiator has a thermostatic control 11 in association with the heating elements 5 and the other components therein, connected in a conventional manner, and which would be adapted to turn the heating element 5 off when a temperature of the coolant within the fluid circuit or closed loop fluid flow circuit meets a pre-determined level, or when it is detected that a component has failed. For example, if a pump malfunctions and is no longer circulating the coolant, or if there is insufficient coolant in the system, the thermostatic control 11 effects the shut down of the heating element 5 or heating elements. Additionally, the thermostatic control can be adapted to turn the heating element 5 on when a temperature of the coolant within the radiator 1 falls below a pre-determined level. In an alternative embodiment, a timer (not shown) can also be utilized to selectively pre-set a temperature at which to activate and/or de-activate the heating element 5 within the radiator 1. Of course, information regarding the thermostatic control 11 is forwarded and controlled, if desired, through a remote device. In an exemplary embodiment, the remote device can be a cell phone, tablet or computing device, though it will be understood that variations to these are possible and numerous, and connections to each of which we well known in the art, such as by cell phone application.

In a further embodiment, and with reference to FIG. 2, the radiator 1 also possesses a sensor 9 for monitoring parameters of the radiator 1 through the remote device. The parameters of the radiator which can be monitored remotely can comprise time of use, temperature and cost of use, though many other variations to this are possible, as would be apparent to one skilled in the art. In this manner, the remote device of the present invention can, as discussed, selectively activate (or deactivate) the radiator 1 from a distance. Of course, the radiator can also contain thereon a conventional on/off switch (not shown), as would be apparent to one skilled in the art.

Figure 3:
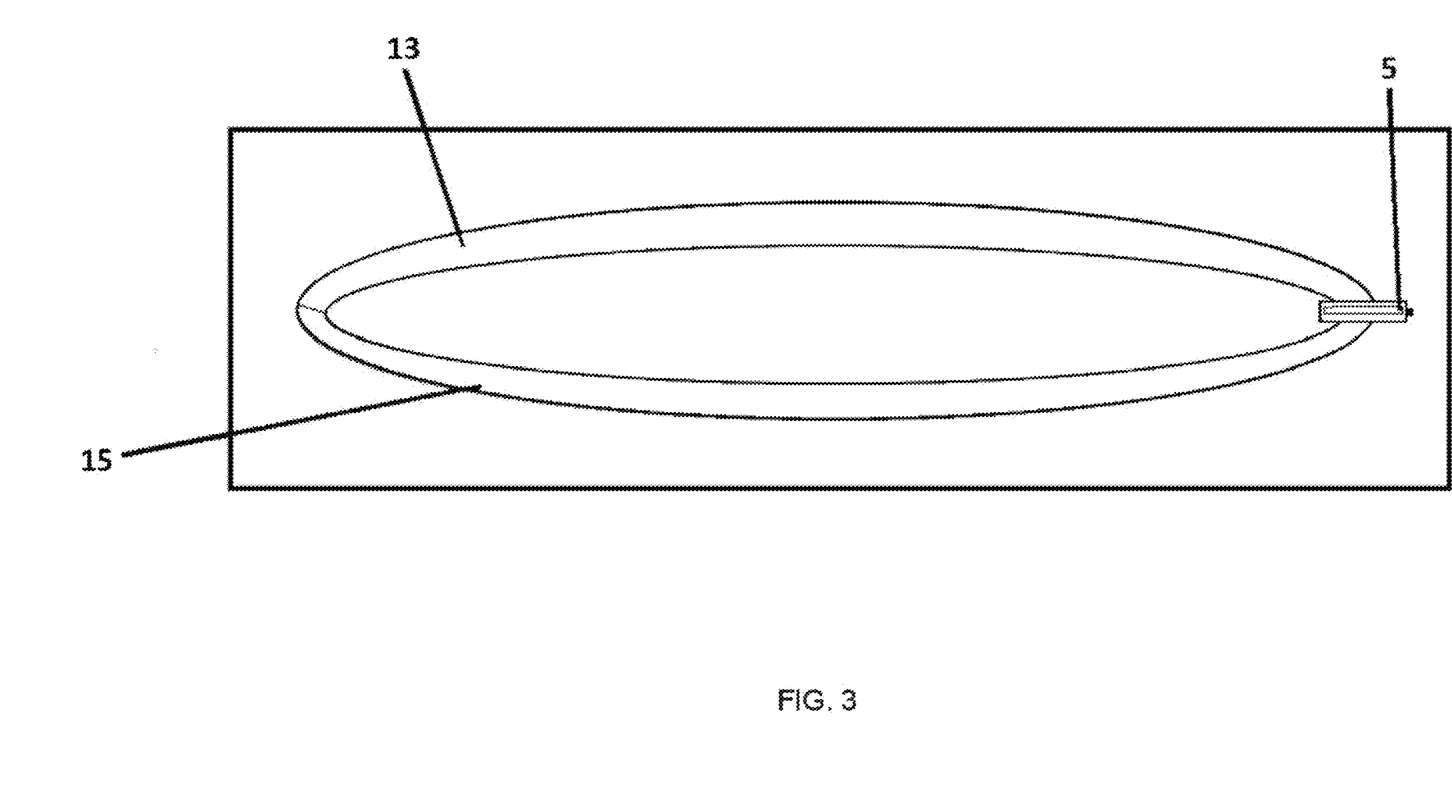
FIG. 3 is a side view of the embodiment of the heat emitting radiator of the present invention shown in FIG. 1, illustrating the heating element beginning to heat the fluid in the upper half of the fluid circuit.
Figure 4:
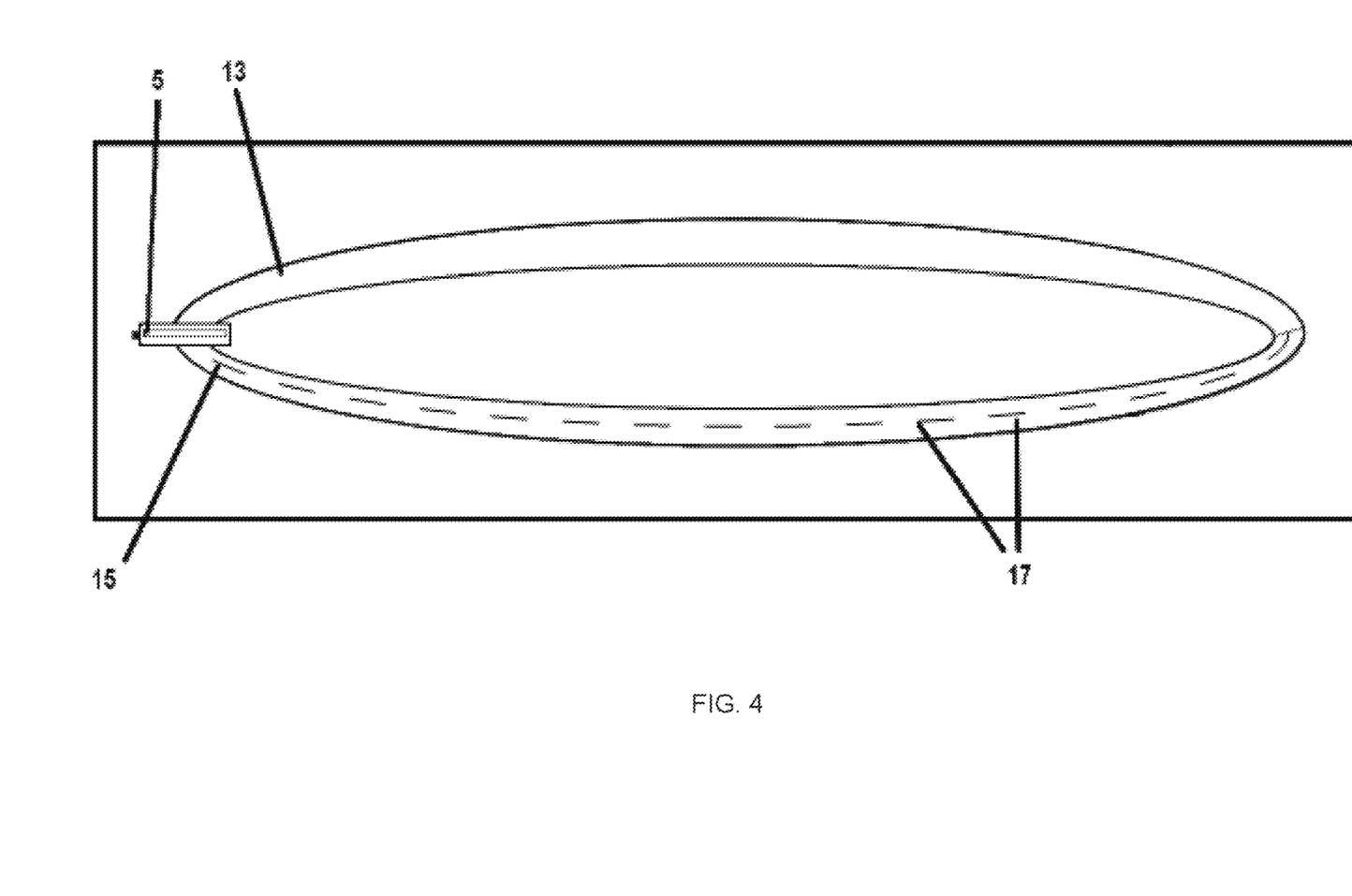
FIG. 4 is a side view of the embodiment of the heat emitting radiator of the present invention shown in FIG. 3, illustrating the heating element beginning to also heat the fluid in the lower half of the fluid circuit.
Figure 5A:
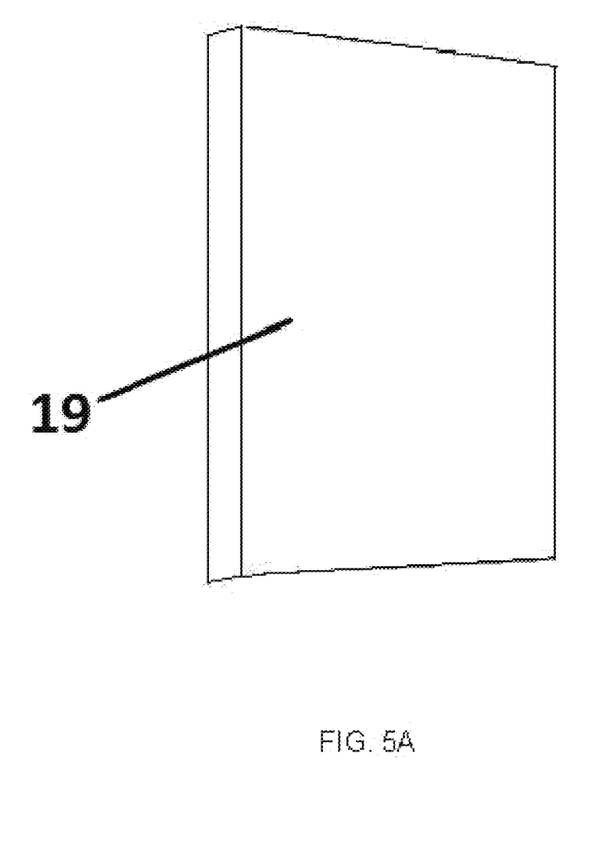
FIG. 5A is a perspective view of a cover/radiator panel for covering the heat emitting radiator of the present invention.
Figure 5B:
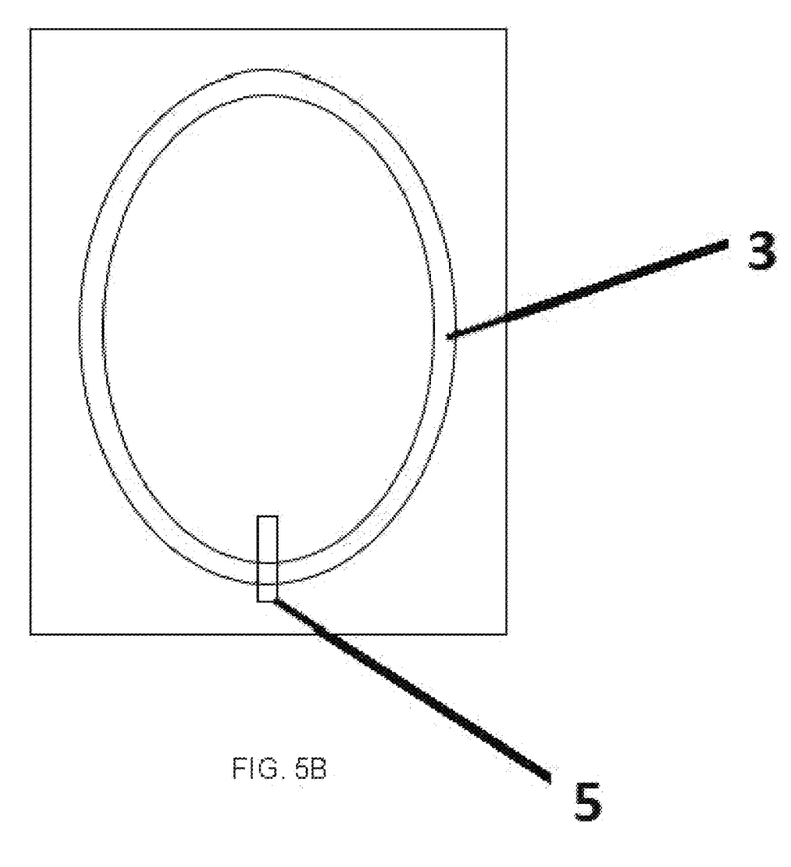
FIG. 5B is a front view of the heat emitting radiator of the present invention, shown in FIG. 4, illustrating the fluid circuit now fully heated.

With reference to FIG. 3, it can be seen that the heating element 5, has begun to heat the fluid (coolant) in the fluid circuit, with the upper portion 13 of the circuit being heated first, while coolant in the lower portion 15 of the circuit remaining cool. As the heating element 5 continues to heat the circuit, the lower portion 15 begins to heat up as well, as shown at 17. FIG. 5B illustrates the fluid circuit fully heated, while FIG. 5A illustrates a radiator/covering panel 19 designed to cover the radiator and the fluid circuit 3. Of course, it will be understood that radiator/covering panel 19 can also have thereon visible displays of information information that is typically forwarded to the remote device, such as the information concerning the thermostatic control 11 and the parameters from the sensor 9.

Figure 6:
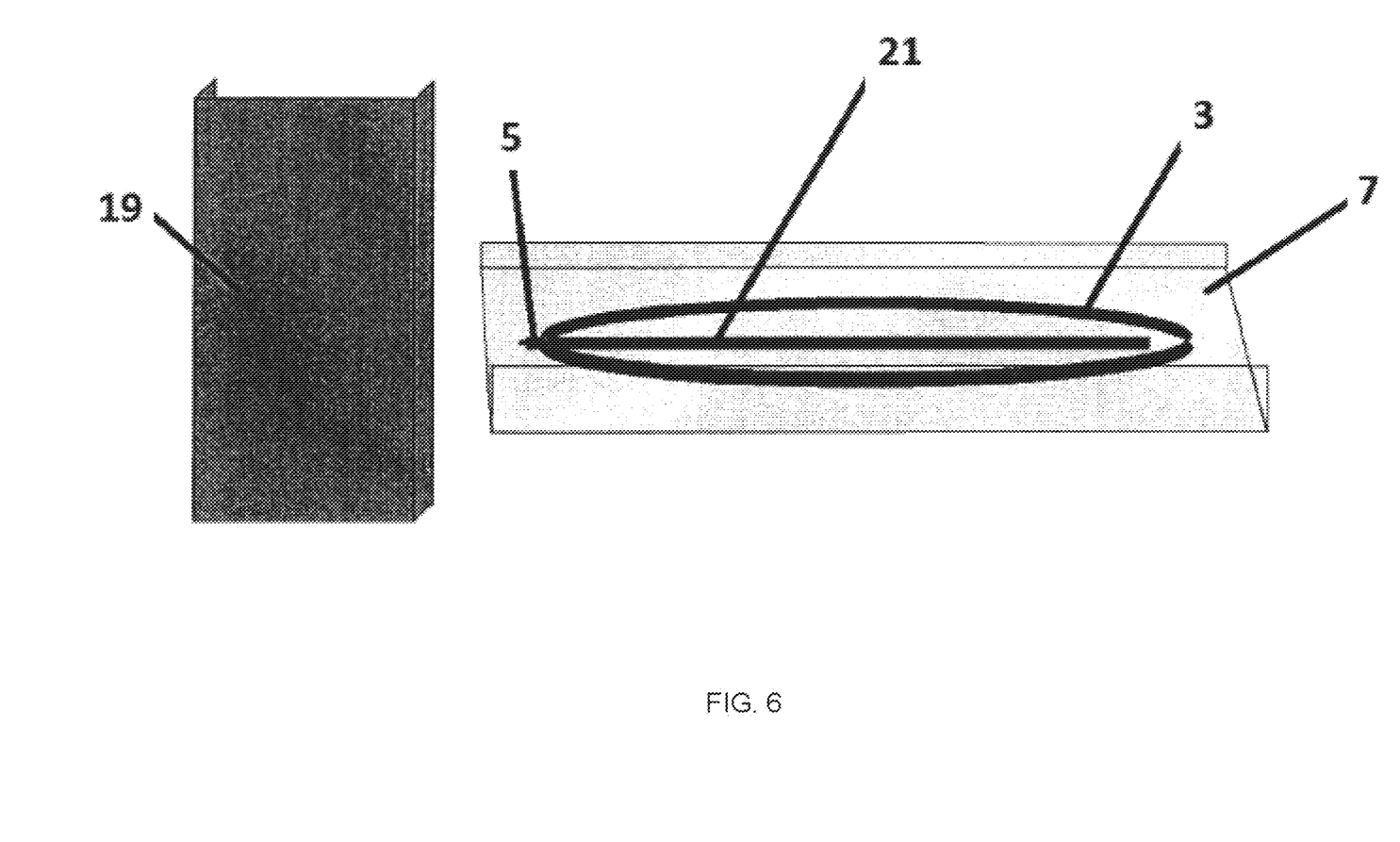
FIG. 6 is a front perspective view of a further embodiment of the heat emitting radiator of the present invention.
Figure 7:
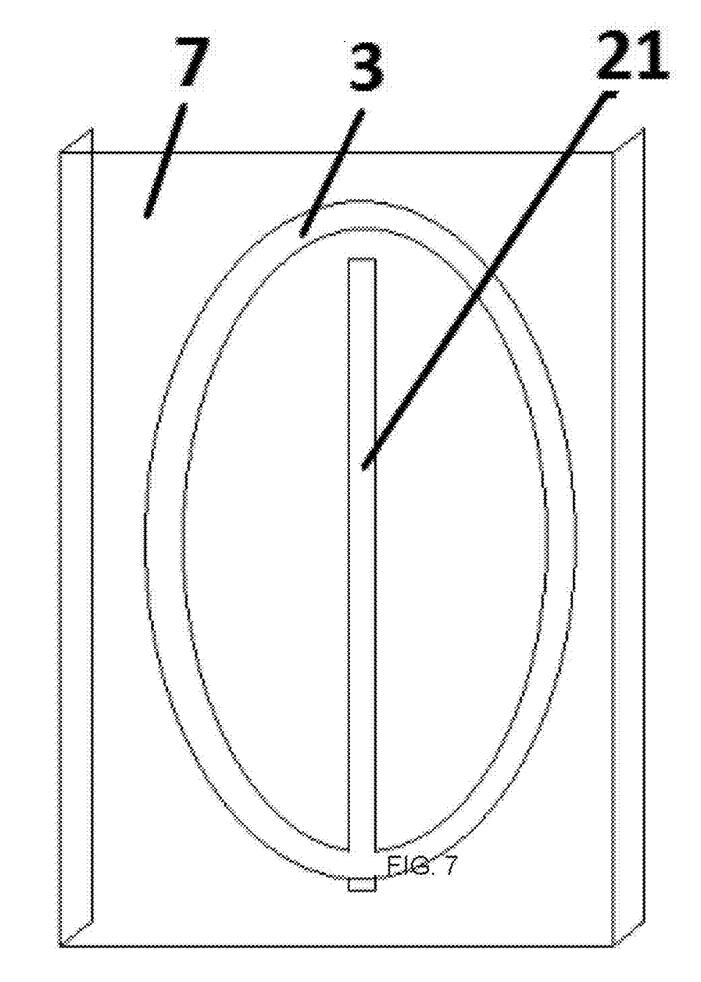
FIG. 7 is a front view of the embodiment of the heat emitting radiator of the present invention shown in FIG. 6.

With reference to FIG. 6, there is shown an alternate embodiment of the heat emitting radiator 1 of the present invention, which illustrates a fluid circuit 3 positioned within a base panel 7, a heating element in communication with the fluid circuit 3, and the circuit having a centrally positioned extra tube section 21 therein. It will be understood that numerous extra tube sections could be contemplated, and, in an exemplary embodiment, the tube sections are made of aluminum, though of course variations to this are possible, as would apparent to one skilled in the art. Of course, radiator/covering panel 19 covers the radiator and the fluid circuit 3 contained within the base panel 7. FIG. 7 illustrates a wall mounted version of the heat emitting radiator of the present invention.

In an exemplary embodiment, the fluid circuit in the radiator 1 is heated by the heating element 5 to 180 degrees Fahrenheit, at which point the radiator 1, and more importantly, the heating element 5 used to heat the fluid circuit or closed loop fluid flow circuit in the radiator 1, is deactivated for a period of time, and no power is supplied to the radiator 1 or heating element 5. In an exemplary embodiment, this active "turn on" temperature is 80-90 degrees Fahrenheit. It will also be understood, however, that variations as to the deactivation temperature, and the activation temperature within the radiator 1, can be utilized, as would be apparent to one skilled in the art.

In this manner, by virtue of the self-contained nature of the radiator 1, the cost of heating a home utilizing the prolonged heat emitting radiator 1 of the present invention can be reduced, in some cases, drastically with no $CO_2$ or other emissions, resulting in a completely green tech radiator and heating unit.

The present invention has been described herein with regard to preferred embodiments. However, it will be obvious to persons skilled in the art that a number of variations and modifications can be made without departing from the scope of the invention as described herein.

What is claimed is:

1. A heat emitting radiator for heating a space, comprising:
    a fluid circuit within the radiator for retaining coolant therein, the fluid circuit further comprising at least one opening defined therein in communication with the fluid circuit, wherein the fluid circuit is a closed fluid circuit;
    at least one heating element constructed and arranged for insertion into the at least one opening and projecting into the fluid circuit, whereby the at least one heating element is in direct contact with the coolant to heat the coolant; and
    monitoring means for selectively activating or de-activating the heating element through a remote device, and monitoring parameters of the radiator,
    wherein, upon activation of the heating element, the coolant is circulated through the fluid circuit only by convection.

2. The heat emitting radiator of claim 1, wherein the remote device is selected from the group consisting of a cell phone, tablet or computing device.

3. The heat emitting radiator of claim 1, wherein the parameters of the radiator further comprise time of use, temperature and cost of use.

4. The heat emitting radiator of claim 1, wherein the heat emitting radiator further comprises a thermostatic control adapted to selectively turn off the radiator when a selected determined shut off temperature within the fluid circuit has been achieved, and then activate the heat emitting radiator to an active position when a selected turn on temperature within the fluid circuit has been achieved.

5. The heat emitting radiator of claim 1, wherein the fluid circuit comprises a plurality of openings defined therein projecting into the fluid circuit, each of the plurality of openings having a heating element inserted therein.

6. The heat emitting radiator of claim 1, wherein the radiator is constructed and arranged for interconnection with a power source.

7. The heat emitting radiator of claim 6, wherein the power source provides power derived from the group consisting of solar power cells, turbine power, A/C power, DC power, battery power, wind generated power and electrical power.

8. The heat emitting radiator of claim 7, wherein the fluid circuit is a closed fluid circuit.

9. The heat emitting radiator of claim 1, wherein the fluid circuit further comprises at least one flow tube integrated therein for retaining the coolant.

\* \* \* \* \*